United States Patent
Scarpa et al.

(10) Patent No.: US 8,184,743 B2
(45) Date of Patent: May 22, 2012

(54) OVERLAY MODULATION TECHNIQUE FOR COFDM SIGNALS BASED ON AMPLITUDE OFFSETS

(75) Inventors: Carl Scarpa, Plainsboro, NJ (US);
Edward Schell, Jackson, NJ (US);
Christopher Strolle, Fort Washington, PA (US)

(73) Assignee: Sirius XM Radio Inc., New York, NY (US)

( * ) Notice: Subject to any disclaimer, the term of this patent is extended or adjusted under 35 U.S.C. 154(b) by 824 days.

(21) Appl. No.: 12/184,659

(22) Filed: Aug. 1, 2008

(65) Prior Publication Data

US 2009/0161777 A1 Jun. 25, 2009

Related U.S. Application Data

(60) Provisional application No. 60/963,007, filed on Aug. 1, 2007, provisional application No. 61/072,638, filed on Mar. 31, 2008.

(51) Int. Cl.
*H03K 9/00* (2006.01)
(52) U.S. Cl. ......................................... 375/316
(58) Field of Classification Search .................. 375/329, 375/316, 340, 260
See application file for complete search history.

(56) References Cited

U.S. PATENT DOCUMENTS 6,535,564 B1   3/2003   Mandyam
7,050,511 B2   5/2006   Jeong et al.
2004/0213358 A1   10/2004   Patel et al.
2005/0213688 A1   9/2005   Missoni
2006/0215790 A1*  9/2006   Dibiaso et al. ............... 375/330

OTHER PUBLICATIONS

International Search Report and Written Opinion of the International Searching Authority, issued for corresponding PCT Application No. PCT/US2008/71942, dated Oct. 22, 2008.

* cited by examiner

*Primary Examiner* — Kevin Kim
(74) *Attorney, Agent, or Firm* — Kramer Levin Naftalis & Frankel LLP

(57) ABSTRACT

Systems and methods are presented for transmitting additional data over preexisting differential COFDM signals by changing the amplitude of the legacy data symbols. In exemplary embodiments of the present invention, additional data capacity can be achieved for a COFDM signal which is completely backwards compatible with existing legacy satellite broadcast communications systems. In exemplary embodiments of the present invention, additional information can be overlaid on a legacy COFDM signal by applying an amplitude offset to the legacy symbols. In exemplary embodiments of the present invention, special receiver processing can be implemented to extract this additional information, which can include performing channel equalization across frequency bins to isolate the amplitude modulated overlay signal. For example, at each FFT symbol time, average power across neighboring active data bins can be used to determine the localized power at the corresponding FFT bins, and a channel inversion can then, for example, be performed on the data bins to restore, as best as possible, the original transmitted symbol amplitude.

10 Claims, 4 Drawing Sheets

OVERLAY MODULATION TECHNIQUE FOR COFDM SIGNALS BASED ON AMPLITUDE OFFSETS

CROSS-REFERENCE TO OTHER APPLICATIONS

This application claims the benefit of and hereby incorporates by reference U.S. Provisional Patent Applications No. 60/963,007 and 61/072,638, each entitled "OVERLAY MODULATION TECHNIQUE FOR COFDM SIGNALS BASED ON AMPLITUDE OFFSETS", and filed on Aug. 1, 2007 and Mar. 31, 2008, respectively.

TECHNICAL FIELD

The present invention relates to satellite broadcast communications, and more particularly to methods and systems for transmitting additional data over preexisting differential Coded Orthogonal Frequency Division Multiplexing ("COFDM") signals by changing the amplitude of data symbols.

BACKGROUND INFORMATION

In certain broadcast communications systems, such as, for example, satellite radio, in order to optimize the utilization of a fixed bandwidth, hierarchical modulation ("HM") can be used to overlay data for new services on top of a legacy transmission. Such a scheme can be used, for example, to offer additional channels or services. For example, in the Sirius Satellite Radio, Inc. ("Sirius") Satellite Digital Audio Radio Service ("SDARS"), video channels can be sent over existing audio channels via such an overlay modulation scheme, where the video signal is sent in a "Layer 2" or overlay modulation layer, on top of an existing audio service, known as the "legacy" signal.

There are many approaches to hierarchical modulation, each utilizing a further modulation of a transmitted legacy bit or symbol as to amplitude, phase or a combination of the two. For example, hierarchical modulation can involve the perturbation of original legacy Quadrature Phase Shift Keying ("QPSK") symbol constellation points, which can, for example, carry audio and data traffic, to convey additional information, such as, for example, video. Thus, for example, such an overlay modulation scheme can carry video data fully independently of the legacy data (original QPSK symbol) carrying a variety of audio channels. For example, Sirius' Backseat TV™ service uses an overlay modulation technique to send video on top of its existing legacy audio channels.

Existing satellite broadcast communication systems, such as, for example, Sirius' SDARS, can employ two forms of modulation to convey information, single carrier QPSK and multi-carrier differential COFDM.

QPSK is a modulation technique that allows for the transmission of digital information across an analog channel. In QPSK, data bits are grouped into pairs with each pair represented by a particular waveform, commonly referred to as a symbol. There are four possible combinations of data bits in a pair, and a unique symbol is required for each possible combination of data bits in a pair. QPSK creates four different symbols, one for each pair, by changing the I gain and Q gain for the cosine and sine modulators. The symbol is then sent across an analog channel after modulating a single carrier. A receiver can demodulate the signal and look at the recovered symbol to determine which combination of data bits in a pair was sent.

COFDM is a modulation technique that can distribute a single digital signal across one thousand (1,000) or more signal carriers simultaneously. Coded data is modulated and inserted into orthogonal carriers in the frequency domain. Because signals are sent at right angles to each other, the signals do not interfere with one another. In general, the term "multi-path effects" refers to the scattering of a signal due to obstructions such as canyons, buildings, etc., that can cause a signal to take two or more paths to reach its final destination. COFDM is highly resistant to multi-path effects because it uses multiple carriers to transmit the same signal. Thus, techniques to implement hierarchical modulation over legacy COFDM transmissions are a desideratum in the art.

SUMMARY OF THE INVENTION

Systems and methods are presented for transmitting additional data over preexisting differential COFDM signals by changing the amplitude of the legacy data symbols. In exemplary embodiments of the present invention, additional data capacity can be achieved for a COFDM signal which is completely backwards compatible with existing legacy satellite broadcast communications systems. In exemplary embodiments of the present invention, additional information can be overlaid on a legacy COFDM signal by applying an amplitude offset to the legacy symbols. In exemplary embodiments of the present invention, special receiver processing can be implemented to extract this additional information, which can include performing channel equalization across frequency bins to isolate the amplitude modulated overlay signal. For example, at each FFT symbol time, average power across neighboring active data bins can be used to determine the localized power at the corresponding FFT bins, and a channel inversion can then, for example, be performed on the data bins to restore, as best as possible, the original transmitted symbol amplitude.

DETAILED DESCRIPTION OF THE INVENTION

In exemplary embodiments of the present invention, additional data can be transmitted over preexisting (legacy) differential COFDM signals by changing the amplitude of legacy data symbols.

In systems employing hierarchical modulation schemes, the possible states a symbol can have are interpreted differently than in systems using conventional modulation techniques, such as, for example, QPSK. By treating the location of a symbol within its quadrant and the particular quadrant in which the state is located as a priori information, two separate data streams can, for example, be transmitted over a single transmission channel. In systems employing hierarchical modulation schemes, one data stream can be used, for example, as a secondary data stream while the other can be used, for example, as a primary data stream. Such a secondary data stream typically has a lower data rate than the primary stream. The present invention contemplates the use of hierarchical modulation in a Satellite Digital Audio Radio System ("SDARS") while maintaining backward compatibility for legacy receivers.

Figure 1:
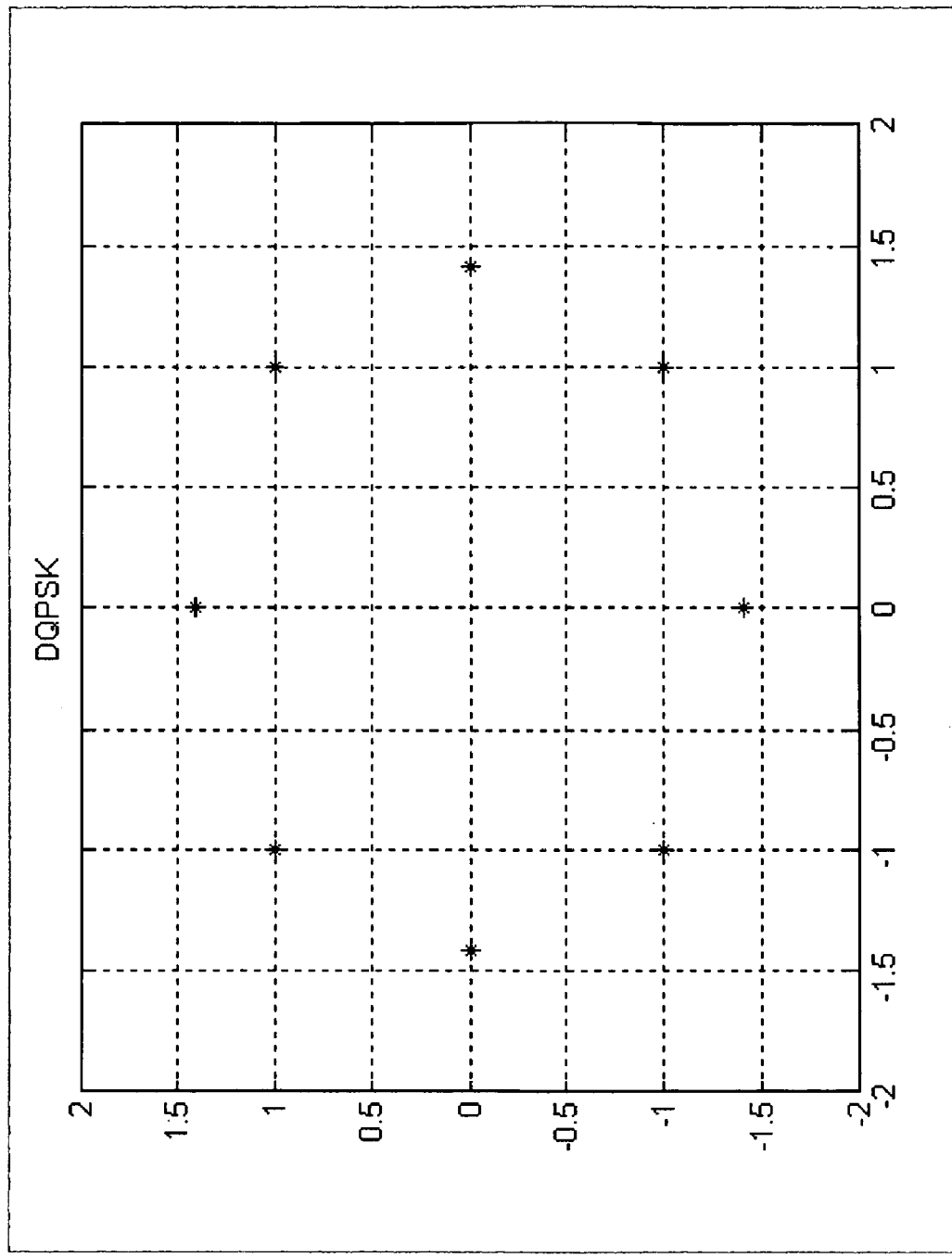
FIG. 1 illustrates an exemplary constellation resulting from single carrier QPSK modulation, such as found in legacy bit streams.

FIG. 1 depicts an exemplary Differential Quadrature Phase Shift Keying (DQPSK) constellation. DQPSK refers to the procedure of generating a transmitted QPSK symbol by calculating the phase difference between the current and the preceding QPSK symbol. In such a modulation scheme, all information (i.e., two binary bits per symbol) is conveyed by the difference in phase across frequency bins. Generally, a starting bin, known as a pilot bin, is used as a reference and all additional bins within a group can be differentially modulated based on the starting phase of the pilot bin and its adjacent data bin.

For example, the current modulation scheme used by Sirius XM Radio Inc.'s SDARS utilizes two pilot bins, one starting at a band edge, wherein the first 500 data bins following the pilot bin are differentially modulated. A null bin follows these 500 data bins, which is used to avoid carrier leakage into active data bins. After the null bin, a second pilot bin is used as a reference phase for a second group of 500 active data bins following said second pilot bin. The combination of 1000 active data bins, two pilot bins and one null bin are used to load a Fast Fourier Transform (FFT) symbol. This data can then be placed into an inverse FFT engine, appended with a guard interval and radio frequency (RF) processed for transmission.

Such a differential phase encoding technique can be viewed mathematically as follows:

$$Z_0 = (1/\sqrt{2}) + j*(1/\sqrt{2})$$

$$Z_1 = Y_0 * Z_0$$

$$Z_2 = Y_1 * Z_1$$

Where $Y_i(n) = [+/-1, +/-j]$, i is the FFT bin number, and n is an index for the FFT points in a bin (and j is the square root of $-1$, the basis of imaginary numbers). Moreover, it is noted that in the above equations $Z_0$ is a pilot symbol, which carries no information. It only provides a starting phase for the modulation process.

If applied to a data set that consists of +/-1 unity symbols, such modulation results in an exemplary symbol constellation as is depicted in FIG. 1.

After modulation and transmission, a receiver can then accept these symbols and can, for example, perform an inverse differential decoding process (similar to the differential encoding process described above) to remap the data symbols into normal QPSK constellations.

In exemplary embodiments of the present invention, an addition to such a first layer modulation scheme to encode additional overlay information onto existing symbols generated by such first layer of modulation can be done in a manner that minimally harms reception by existing receivers. I.e., an existing legacy receiver that is only designed or configured to decode legacy data (layer 1) will not experience much difficulty by the presence of the overlay modulation on the symbols it receives in such exemplary embodiments. Thus, in exemplary embodiments of the present invention the additional information can be carried on the amplitude of each data bin.

Figure 4:
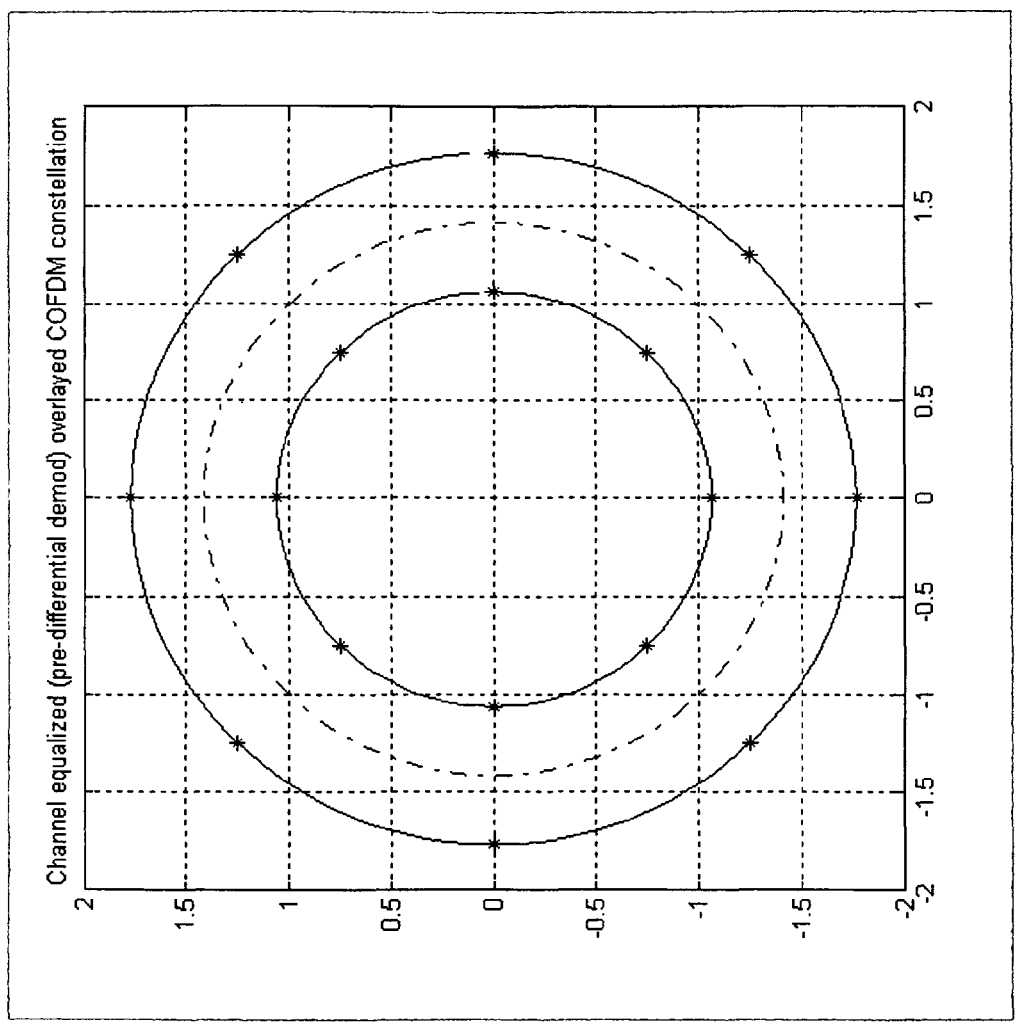
FIG. 4 illustrates an exemplary set of data rings (and a unit circle shown as a dotted line) resulting from an exemplary modulation scheme according to an exemplary embodiment of the present invention.

Thus, in exemplary embodiments of the present invention, an overlay modulation process can start as described above, but the amplitude of each legacy I/Q symbol can then be changed in accordance with an overlay modulation bit. For example, if the additional overlay information is a logical 1, then the amplitude of the I/Q pair for a particular bin can be increased from its nominal value of 1 to the value 1+D. Conversely, a logic 0 can be transmitted in the amplitude of each I/Q pair by decreasing the amplitude to a value 1−C. It is noted that the nominal value of 1 for legacy amplitude is exemplary only, and in exemplary embodiments of the present invention, nominal first layer symbol amplitude can be increased so as to provide more room for amplitude offsets (i.e., the range 1−C to 1+D). In exemplary embodiments of the present invention it is convenient to set C equal to D, or approximately equal to D, so as to have two rings of received symbols that are equidistant, or approximately equidistant, from a ring of legacy symbols, as is shown in FIG. 4. This can, for example, simplify the detection of the overlay information. In alternate exemplary embodiments of the present invention, C need not necessarily be equal to D. Such an exemplary modulation scheme allows for each active data bin to be modulated and, thus, in the example described above, allows for an additional 1000 data bits per FFT symbol.

Thus, for example, in exemplary embodiments of the present invention the FFT symbol rate can be approximately 4 kHz per second, thus allowing for a total of 4 million additional data bits per second.

Figure 2:
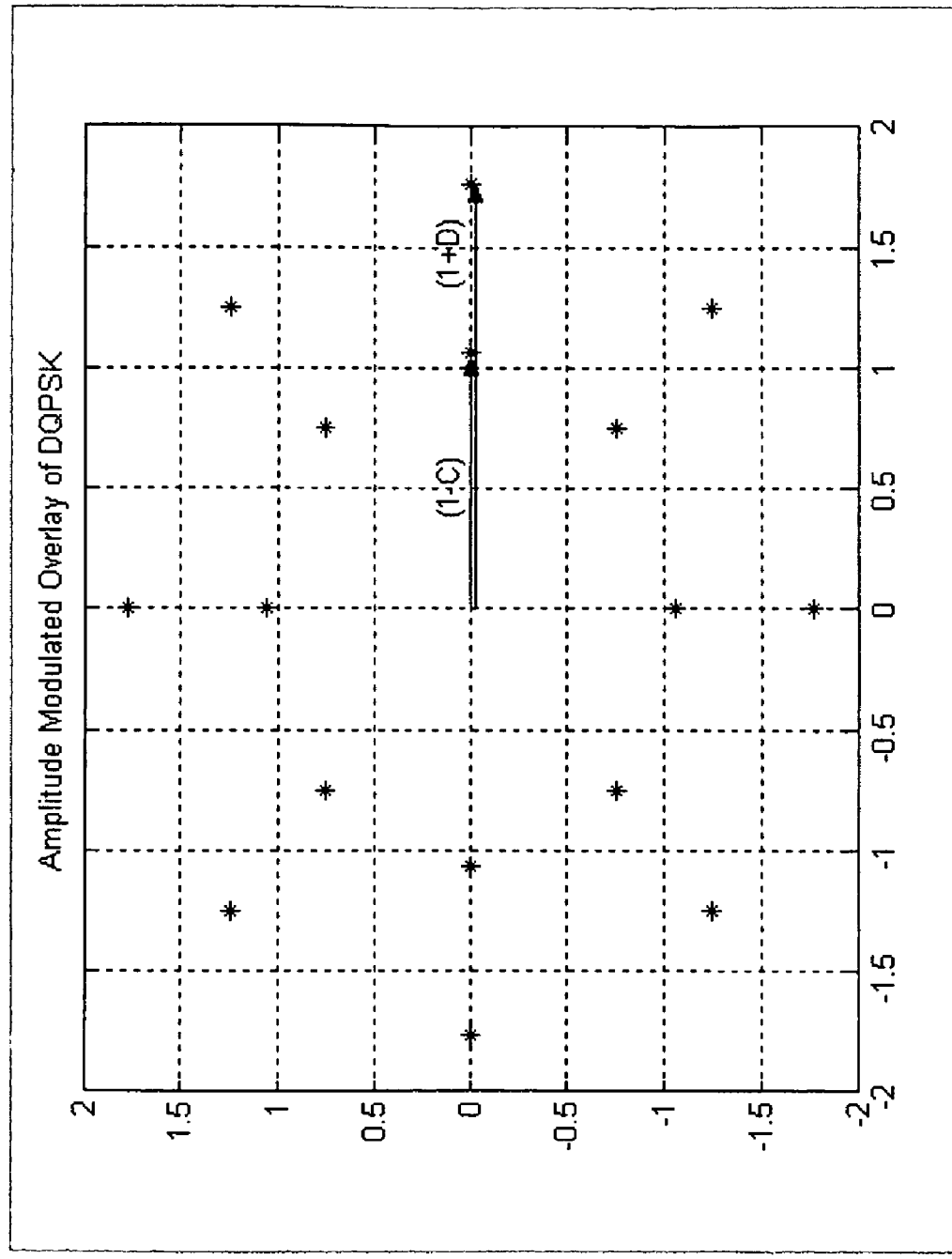
FIG. 2 illustrates an exemplary constellation resulting from an exemplary modulation scheme of the symbols shown in FIG. 1 according to an exemplary embodiment of the present invention.

In exemplary embodiments of the present invention, a transmitted overlay modulated constellation can appear as is illustrated in FIG. 2, where there is now a ring of DQPSK symbols at an amplitude of 1−C, and a second ring of DQPSK symbols at an amplitude of 1+D (where the amplitude of each of the original legacy symbols was nominally 1).

In exemplary embodiments of the present invention, the average power transmitted using an overlay modulation scheme can, for example, be essentially the same as a legacy system. In this approach a receiver's AGC will not see any adverse effects.

Thus, to achieve this specification, the average power from the new constellation can be set to equal unity. In exemplary embodiments of the present invention, independently controlling C and D can allow for this as well as for possible additional system optimization procedures in the future. Thus, at a receiver, in exemplary embodiments of the present invention, a channel equalization technique can, for example, be used that can be based on a unit power transmitted constellation. To maintain unit power, the following equation must hold:

$$[(1-C)^2 + (1+D)^2]/(2*2) = 1 \qquad \text{Eq. A}$$

In exemplary embodiments of the present invention where C is not desired to be approximately equal to D, one possible candidate offset pair to implement this condition can be, for example, C=0.2928 and D=0.8708. The resulting constellation will thus average to unit power.

Alternately, in some exemplary embodiments of the present invention, as noted, setting C equal to D, or substantially equal to D, can be preferred, and average power can be allowed to exceed unit power.

In exemplary embodiments of the present invention, an amplitude offset can be applied either before or after the differential modulation process. To ensure minimal impact to current (legacy) receivers, optimal performance can be obtained if overlay amplitude changes are applied after the differential modulation process used to generate the legacy symbols. The effect on the received signal to the legacy receivers and next generation receivers (i.e., those equipped to detect both a legacy signal and an overlay signal) will be to appear as if the signal has undergone a multipath distortion. This can, for example, take away some ability of such legacy receivers to withstand multipath distortion. Any resulting degradation cannot precisely be predicted but is expected to be small because the constellation will see destructive interference half of the time and constructive interference the remainder of the time. The overall effect can thus be expected to average out within, for example, a trellis decoder.

At the receiver, legacy and future generation radios that recover the fundamental signal will process the COFDM signal with no change. As discussed above, to the legacy decoding process the received signal will appear to have multipath distortion induced on the fundamental signal. Layer two data (i.e., overlay data) modulation will need to extract this additional information. Because, in exemplary embodiments of the present invention, all layer two modulation is encoded in the amplitude of the signal, an additional processing step is thus required.

Figure 3:
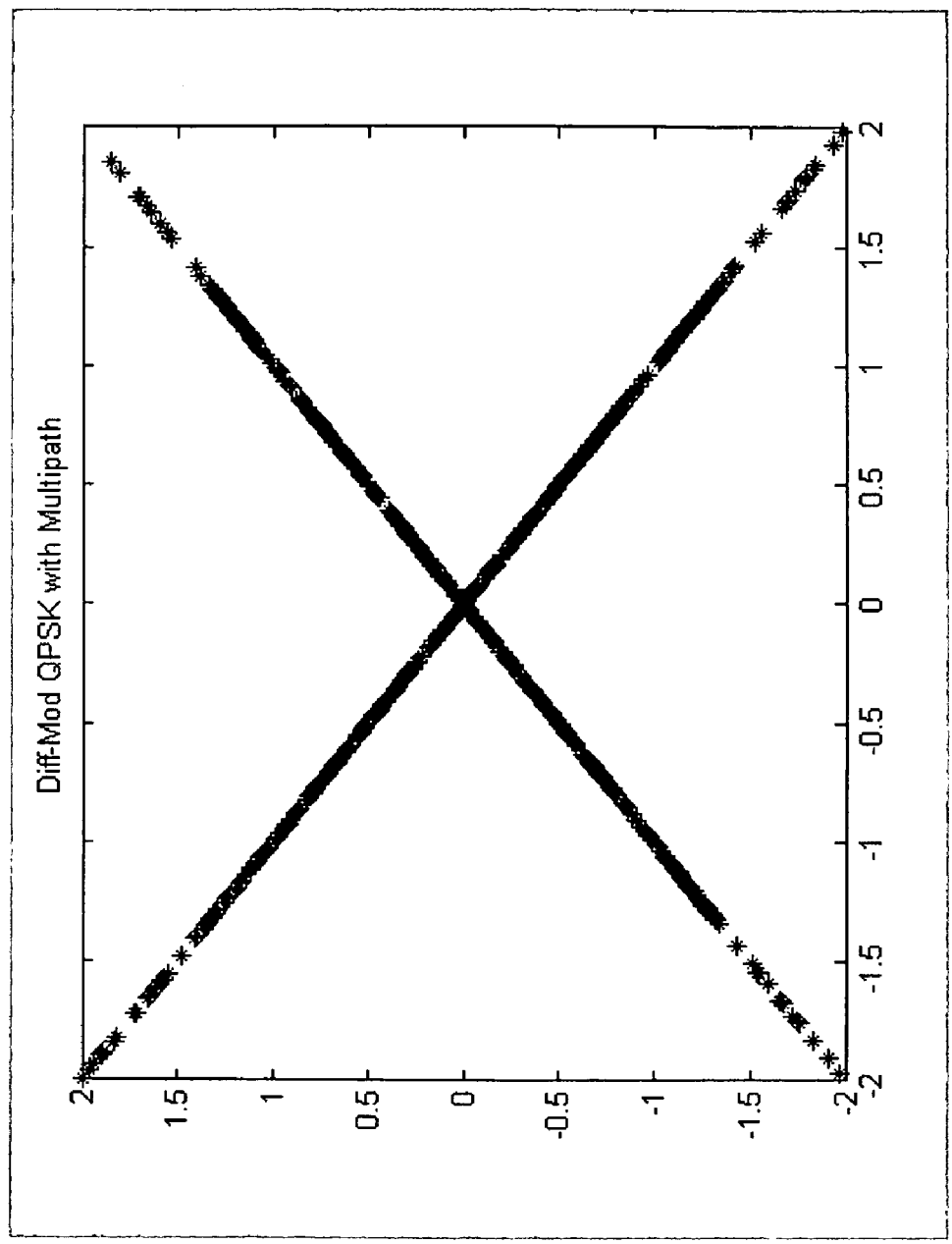
FIG. 3 illustrates an exemplary fan blade type distortion resulting from a multipath distortion manifested on a differentially modulated QPSK signal.

Accordingly, in exemplary embodiments of the present invention, under normal operation, a received signal will contain multipath distortion that manifests itself onto a differentially modulated QPSK signal as a fan blade type of distortion as is illustrated, for example, in FIG. 3 (shown with no receiver noise). This does not generally pose a problem to the receivers inasmuch as all legacy information is contained in the phase of the signal, and not in its amplitude. Current legacy receivers process the signal through a trellis decoder as is, using the fan blade effect to essentially weight the trellis trace back matrix. This step can, for example, remain unchanged to recover the layer one data.

In exemplary embodiments of the present invention, to recover the layer two data (i.e., the overlay data), channel amplitude equalization can be used, for example, to extract the additional data. As discussed above, in exemplary embodiments of the present invention the data set can be transmitted with an averaged unity power across each active frequency bin. Thus, at the receiver, one can take advantage of this fact and perform channel equalization across frequency bins to isolate the amplitude modulated overlay signal. For example, at each FFT symbol time, an average power across neighboring active data bins (which can be performed, for example, by a Finite Impulse Response filter) can be used to determine the localized power at the corresponding FFT bins. Channel inversion can then, for example, be performed on the data bins (for example, zero forced or Minimum Mean Square Error) to restore, as best as possible, the original transmitted symbol amplitude. If this step is taken, the resulting constellation can, for example, be restored as is illustrated in FIG. 4 (shown with no receiver noise), which consists of two rings prior to differential demodulation.

In exemplary embodiments of the present invention, overlay data can be decoded, for example, by slicing between the data rings. The vector distance of each point (after channel equalization) can be computed and compared against a center decision ring, which itself can be determined by, for example, slicing equally between the two received rings, or for example, by calculating the amplitude of reference symbols from adjacent FFT bins that have not been overlay modulated. One of the many advantages of this overlay technique is the avoidance of a 3 dB loss in detection probability due to the multiplicative effect in differential demodulation. Yet another advantage of this overlay technique is that the data can be modulated in such a manner that the overlay modulated signal has minimal effect on maximum ratio combining (MRC) that may be done in legacy systems, inasmuch as this does not increase the signal to noise ratio.

In exemplary embodiments of the present invention the disclosed method can be implemented in hardware, software, firmware or any combination of the above, and be implemented in a transmitter or transmission device. Similarly, a complementary method of demodulation can be stored on in a similar manner and implemented in a demodulator or a receiver. For example, a program storage device such as a microprocessor with memory, or for example, a separate microprocessor memory can store a program of instructions sufficient to implement exemplary methods according to the present invention.

While the present invention has been described with reference to certain exemplary embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed:

1. A receiver, comprising:
   a receiving stage to receive layer 1 I,Q symbols that have been further modulated with a layer 2 overlay amplitude change;
   a trellis decoder to decode the layer 1 I,Q symbols;
   a channel equalization stage to recover the originally transmitted signal amplitude; and
   an overlay demodulation stage to detect a direction of the overlay amplitude change.

2. The receiver of claim 1, wherein the channel equalization stage performs channel equalization across frequency bins to isolate the amplitude modulated overlay signal.

3. The receiver of claim 1, wherein the channel equalization stage determines the localized power at corresponding FFT bins of the signal and then performs channel inversion on the data bins to restore, as best as possible, the original transmitted symbol amplitude.

4. The receiver of claim 3, wherein said channel inversion is performed using one of zero forced or minimum mean square error.

5. The receiver of claim 1, wherein at each FFT symbol time, a calculation of average power across neighboring active data bins is used to determine the localized power at the corresponding FFT bins.

6. The receiver of claim 5, wherein said average power is calculated using a finite impulse response filter.

7. The receiver of claim 1, wherein the overlay data is decoded by slicing between the data rings.

8. The receiver of claim 7, wherein said slicing includes computing the vector distance of each constellation symbol after channel equalization and comparing against a center decision ring.

9. The receiver of claim 8, wherein said center decision ring is calculated by at least one of slicing equally between two received symbol rings and with reference to non-amplitude modulated reference symbols.

10. The receiver of claim 9, wherein said non-amplitude modulated reference symbols are obtained from an adjacent FFT bin.

* * * * *